United States Patent [19]

Phillips et al.

[11] Patent Number: 5,278,590
[45] Date of Patent: Jan. 11, 1994

[54] TRANSPARENT OPTICALLY VARIABLE DEVICE

[75] Inventors: Roger W. Phillips; Paul G. Coombs, both of Santa Rosa, Calif.

[73] Assignee: Flex Products, Inc., Santa Rosa, Calif.

[21] Appl. No.: 343,893

[22] Filed: Apr. 26, 1989

[51] Int. Cl.$^5$ .................. G02B 5/28; B42D 15/00
[52] U.S. Cl. ...................... 359/589; 283/91; 283/902; 359/580
[58] Field of Search .............. 283/91, 902, 74; 350/166, 164, 352, 1.7

[56] References Cited

U.S. PATENT DOCUMENTS

| | | | |
|---|---|---|---|
| 3,858,977 | 1/1975 | Baird et al. | 350/166 X |
| 4,048,039 | 9/1977 | Daxinger | 350/166 X |
| 4,639,069 | 1/1987 | Yatabe et al. | 350/1.7 |
| 4,705,300 | 11/1987 | Berning et al. | 283/91 |
| 4,705,356 | 11/1987 | Berning et al. | 350/166 |
| 4,721,217 | 1/1988 | Phillips et al. | 350/166 X |

FOREIGN PATENT DOCUMENTS 0353544  7/1989  European Pat. Off.

*Primary Examiner*—Bruce Y. Arnold
*Assistant Examiner*—David R. Parsons
*Attorney, Agent, or Firm*—Flehr, Hohbach, Test, Albritton & Herbert

[57] ABSTRACT

Transparent optically variable device comprising a symmetric three-layer coating. The three-layer coating has first and second partially transmitting absorber layers and a dielectric spacer layer disposed between the first and second absorber layers.

9 Claims, 1 Drawing Sheet

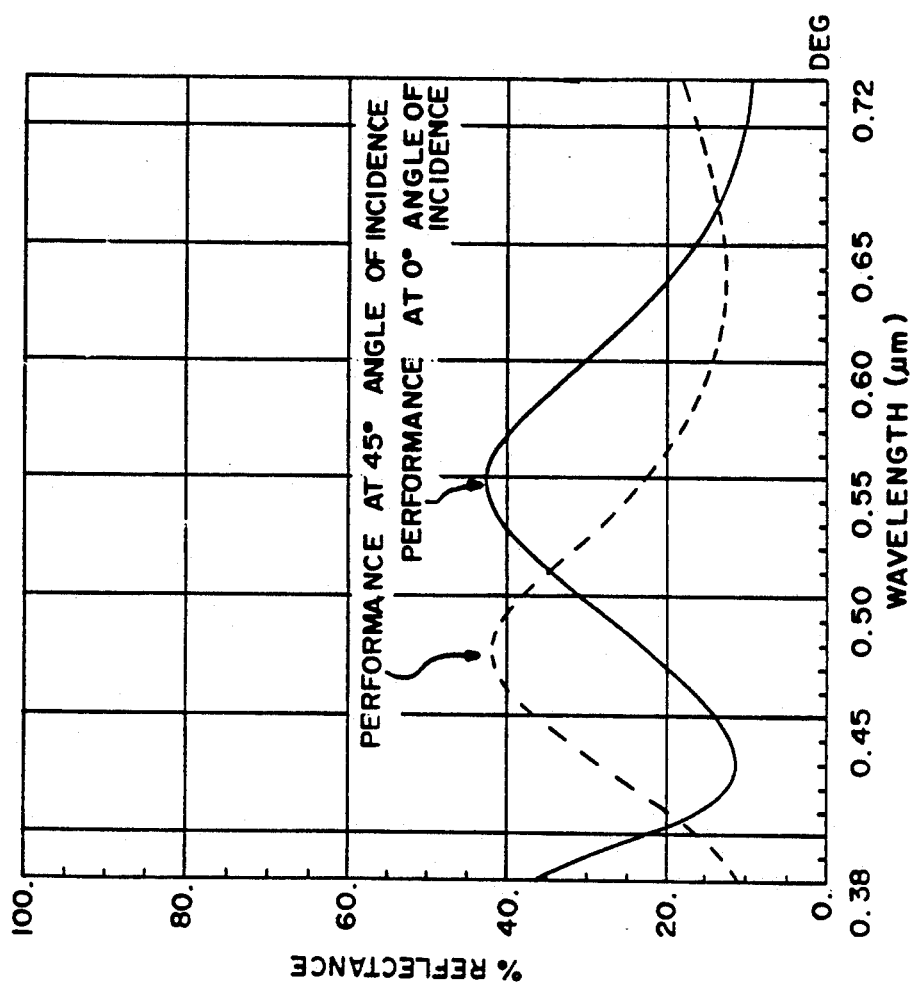
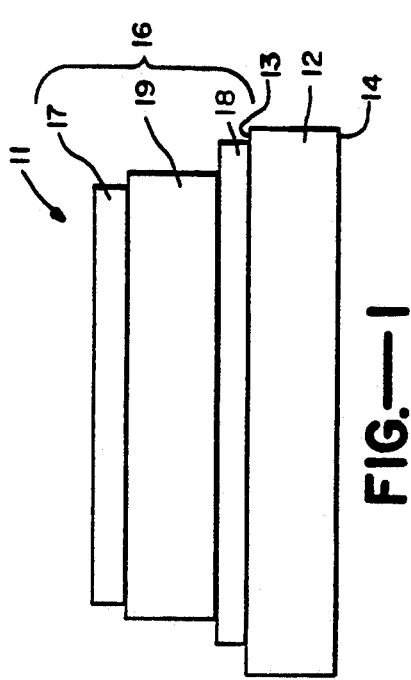

TRANSPARENT OPTICALLY VARIABLE DEVICE

This invention relates to a transparent optically variable device.

Optically variable devices are disclosed in U.S. Pat. Nos. 4,705,300 and 4,705,356. Optically variable devices which can be used in optically variable inks and optically variable pigments are disclosed in application Ser. No. 812,814 filed Dec. 23, 1985, now abandoned in favor of application Ser. No. 251,034 filed on Sept. 26, 1988. However, those optically variable devices are opaque. There is a need for optically variable devices where some transparency can be obtained.

In general, it is an object of the present invention to provide an optically variable device which has some degree of transparency.

Another object of the invention is to provide an optically variable device of the above character which can be utilized in various different types of applications.

Another object of the invention is to provide an optical variable device of the above character which has good color purity.

Another object of the invention is to provide an optically variable device with as few as three layers making possible a lower cost device which can be manufactured on roll coating equipment.

Another object of the invention is to provide an optical variable device of the above character which can be utilized in inks, as optically variable pigment.

Additional objects and features of the invention will appear from the following description in which the preferred embodiments are set forth in detail in conjunction with the accompanying drawing.

FIG. 1 is a cross-sectional view of a transparent optically variable device incorporating the present invention.

FIG. 2 is a view showing the manner in which light is reflected from the optically variable device of the present invention which with angle shift provides a shift from one color to another.

FIG. 3 is a graph of reflectance of a transparent green-to-blue optically variable device incorporating the present invention.

In general, it is an object of the present invention to provide a transparent optically variable device which is comprised of a transparent substrate having a first surface. A symmetric three-layer coating is disposed on the first surface. The symmetric three-layer coating is comprised of first and second partially transmitting absorber layers with a dielectric layer disposed between the first and second absorber layers. The absorber layers can be from 20 to 50% transmitting while still achieving color purity with color shift with angle.

More particularly as shown in the drawings, the optically variable device 11 is comprised of a substrate 12 having a first surface 13 and a second surface 14. In accordance with the present invention the substrate 12 should be formed of a transparent material. One material found to be satisfactory is a polymeric substrate formed, for example of polyethylene terephthalate. A symmetric three-layer coating 16 is carried by the first surface 13 of the substrate 12. The three-layer coating 16 is comprised of first and second absorber layers 17 and 18 with a dielectric spacer layer 19 disposed between the same. The first and second absorber layers 17 and 18 must be at least partially transmitting and preferably have a transmittance ranging from 20 to 50%. The dielectric layer 19 is transparent and serves as an optical spacer layer.

For the first and second absorber layers 17 and 18, it has been found that any one of a number of grey metals which have an n and k which are approximately equal can be utilized. Thus, for example, chromium as well as nickel and palladium can be utilized. For chromium, the grey metal layers can have a thickness ranging from 4.5 to 9.0 nanometers to provide a combined thickness for the first and second layers of 9.0 nanometers to 18 nanometers. For the thickest layers, the overall transmission may be as low as 12% whereas for the 9 nanometer combined thicknesses for the two layers, the transmission may be as high as approximately 30%. It should be noted that other absorbing materials than metal, such as carbon or germanium, could also be used for layers 17 and 18.

In conjunction with the foregoing it has been assumed that the first and second absorber layers 17 and 18 have the same thickness. It should be appreciated that, if desired, the first and second absorber layers can have a different thickness. The bottom or second layer 18 can have a greater thickness than the first layer without substantially affecting color purity when used as an optically variable foil. If the first absorber layer 17 is made too thick, the color shift rapidly diminishes.

The dielectric layer 19 can be formed of a suitable dielectric and preferably a dielectric having a low index of refraction such as magnesium fluoride having an index of refraction of 1.38. Materials having an index of refraction ranging from 1.2 to 1.65 can be used. The dielectric layer can have a thickness ranging from 150 nanometers to 950 nanometers.

The top absorber layer 17 serves as a partial reflector and a partial transmitter. The bottom absorber layer 18 also serves as a partial reflector and a partial transmitter. The reflected portion of the light from the bottom layer 18 interferes with the reflected light coming from the front surface of the metal layer 17. This light interference provides color to the device. The specific color achieved is controlled by the thickness of the dielectric spacer layer 19. This spacer layer thickness controls the wavelength at which the light reflected from layer 17 interferes with light reflected from layer 18. For those wavelengths where the interference is destructive, a great portion of the light is absorbed in the device. For those wavelengths where the interference is constructive, most of the light not transmitted through the device is reflected. It is the combination of high reflectances at some wavelengths and low reflectances at other wavelengths that gives the device its color. The relative intensities of the transmitted and reflected components are controlled by the thicknesses of layers 17, 18 and 19 and the optical properties of the material or materials chosen for layers 17, 18 and 19.

Assuming that a green-to-blue transparent optically variable device 11 is to be provided, the performance of the device can be understood by reference to FIG. 2. For light coming in at relatively small angles relative to the normal, the device would have a green color. For light coming in at higher angles, it would have a blue color. Referring to FIG. 2, for an incident light beam 21 representing 100% of the visible light impinging on the device, a certain or first portion of the light represented by beam 22 will be absorbed within the device, a second portion 23 will be transmitted through the device, and a third portion represented by beam 24 will be reflected from the device. Beam 24 is comprised of light reflected from the outer surface of layer 17 and all the light reflected from internal surfaces of the device 11.

For the green-to-blue transparent optically variable device 11 of the current example, at normal incidence the highest amplitude represented by reflectance of the beam component 24 is at wavelengths near 550 nanometers. At these wavelengths near 550 nanometers, the absorbed component represented by beam 22 is small compared to the reflected component represented by beam 24. The transmitted component represented by beam 23 is also higher at 550 nanometers than at other visible wavelengths. At the same time, at wavelengths near 450 and 700 nanometers the absorbed component represented by beam 22 is large compared to the reflected component represented by beam 24. At wavelengths near 450 and 700 nanometers the transmitted component represented by beam 23 is lower than at wavelengths near 550 nanometers. The result of a high reflectance at 550 nanometers and low reflectances at 450 and 700 nanometers is the color green in reflection. Because the transmitted component represented by beam 23 is more intense at 550 nanometers than at 450 and 700 nanometers, the transmitted component will also appear green to some degree.

Changing the thickness of the dielectric spacer 19 while holding the metal thicknesses of layers 17 and 18 constant results in a change in the reflected color. A device made using a dielectric layer 19 of full wave optical thickness at 530 nanometers has a green color as described above. Reducing the full wave optical thickness of the dielectric layer 19 from 530 to 450 nanometers changes the normally incident reflected color from green to blue. Instead of a transparent optically variable green-to-blue device, there is provided a blue-to-magenta device. Conversely, increasing the full wave optical thickness of the dielectric spacer 19 from 530 to 650 nanometers results in a transparent optically variable magenta-to-green device. Other colors and color shifts in addition to those mentioned above can be produced by varying the full wave optical thickness of the dielectric spacer between the limits of 150 and 950 nanometers. At full wave optical thicknesses below 150 nanometers, the device appears brown or black with no apparent angle shift. At full wave optical thicknesses above 950 nanometers, the color purity is reduced to a point that the device does not function properly.

It should be realized that if the two metal layers are made of the same material and coated to the same thickness, the device is symmetrical. This means that substantially the same optical effect is obtained whether viewed from the direction of the top metal layer 17 or from the direction of the transparent substrate 12.

When viewing the device from the direction or side of the top metal layer 17, it can be seen that a certain portion of the incident light represented by beam 21 will be transmitted through the device as a component represented by beam 23. When a uniform reflective surface 26 such as a piece of white paper 27 is placed a short distance beneath the substrate 12 of the transparent optically variable device 11, a light component represented by beam 31 is reflected off the surface 26 of the paper 27 and impinges on the surface 14 of the substrate 12. The component represented by beam 31 would be comprised of the reflected portion of light component represented by beam 23 and also the reflected portion of any stray light which reaches the paper surface 26 from other sources such as room lights.

Referring to FIG. 2, for an incident light beam 31 representing 100% of the visible light impinging on the backside of the device, a certain portion of the light represented by beam 33 will be transmitted back through the device, a second portion represented by beam 32 will be absorbed within the device, and a third portion represented by beam 34 will be reflected from the device back toward the paper surface 26 and thus is unavailable to the viewer above. Component represented by beam 34 is comprised of light reflected from surface 14 and all light reflected from internal surfaces of the device 11. The component beam 33 reduces the purity of the color of reflected component beam 24. When this reduced color purity is undesirable, the white paper 27 can be replaced by a sheet of black paper which absorbs the incident light beam 23 and any stray light as well, thus eliminating the component beams 31, 32, 33 and 34. Such a device would provide a more pure color to component beam 24. When the white paper 40 is replaced with a different reflective or partially reflective surface, the transmitted component beam 33 would be dependent on the properties of both the transparent optically variable device and the reflective surface 26.

Alternatively, rather than positioning the device 11 above a piece of paper, the device 11 can be bonded or laid directly onto a sheet of paper 27. Without an air gap between the surface 14 and the surface 26, the optical effect of the device 11 is changed. Component beam 31, representing 100% of the light incident on the backside of the device 11, is comprised only of that portion of light beam 23 which is reflected off the paper surface 26. Since there is no gap, there is also no opportunity for stray light to reflect off the paper surface 26. A white or silvery surface is the most efficient for reflecting component beam 23 and in turn results in the most intense re-transmitted component beam 33. A truly black surface eliminates component beam 31, and also component beams 32, 33 and 34. If a black surface is bonded to or is directly under the device 11 instead of a white surface 26, an increase in the color purity of component beam 24 results.

Novel effects in addition to those described above can be achieved through the use of colored transparent substrates. For example, the device can be made to reflect one color at normal angles of incidence, reflect a second color at higher angles, and transmit a third color. In another example, a green-to-blue shifting device transmits more blue light at 45° than at normal incidence. At the same time, blue dyed PET for a substrate 12 transmits only blue light at all angles. Therefore producing a green-to-blue device on blue dyed PET substrate 12 results in a system which transmits significantly more light at 45° than at 0°. At incident angles near normal, the blue light transmitted by the colored substrate is selectively absorbed by the green-to-blue shifting device and hence is not transmitted. When informtion is printed on paper and held behind the aforementioned green-to-blue device on blue PET substrate, the information is only discernible at certain angles, as for example, 45°.

It can be seen that the optical variable device which is shown in FIGS. 1 and 2 provides a significant color shift with change of viewing angle as can be seen from FIG. 3 where the performance is shown at 45° and 0° angles of incidence. In addition, it is possible to achieve at least partial transmittance with only a small sacrifice in purity of the colors.

It should be appreciated that the transparent optically variable device of the present invention can be utilized in various ways. For example, it can be incorporated with printing in the form of a logo or design. In such an application, the transparent optically variable device is placed between the viewer and the printed information. Since the viewer sees the printed information through the optically variable device, the visibility of the printing is affected by the transmittance of the device. For lower transmittance, the optically variable device appears brighter. However, the lower the transmittance the lower the visibility of the image behind the optically variable device.

The optical variable device of the present invention can have many applications, as for example, in anti-counterfeiting. Although the image behind the optical device can be copied on conventional black and white and color copiers, the color shift cannot be copied because of the optical constraints of the copying machine. Dyes used in the toner of copying machines are insensitive to color change as the viewing angle is changed. Only an interference device as described in this invention allows color changes as the viewing angle is changed. The copier will only be able to faithfully reproduce the color of the device for the color at normal angles. The color copier will not copy the color of the device for any colors at non-normal angles. Thus, the copied image will present to the viewer only one color at all viewing angles; i.e., there will be no color shifting properties in the copy, whereas the original has color shifting properties as the viewing angle is changed.

Since the optical variable device of the present invention utilizes a three-layer coating which is symmetric, the coating lends itself for use as pigments. In such applications, the three-layer coating would be deposited on a substrate having a release coat thereon, after which it can be separated from the substrate and broken into particles. Sizing these symmetrical particles allows one to form optically variable pigments for use in ink vehicles as well as other applications as in described in U.S. Pat. No. 4,705,356 and in pending application Ser. No. 251,034.

What is claimed is:

1. In a transparent, optically variable device, a symmetric three-layer interference coating, said three-layer coating comprising first and second partially transmitting absorber layers, said absorber layers having substantially the same composition and thickness and a dielectric spacer layer disposed between the first and second absorber layers, said absorber layers being from 20 to 50% transmitting.

2. A device as in claim 1 wherein said absorber layers have a thickness ranging from 4.5 to 9.0 nanometers.

3. A device as in claim 1 wherein said absorber layers are formed of chromium.

4. A device as in claim 1 wherein said dielectric layer is formed of magnesium fluoride.

5. A device as in claim 1 together with a transparent substrate having a first surface, said symmetric three-layer coating being disposed on said first surface.

6. A device as in claim 5 wherein said transparent substrate is formed of a polymeric material.

7. A device as in claim 6 wherein said polymeric material is polyethylene terephthalate.

8. A device as in claim 6 wherein said substrate is colored.

9. A device as in claim 6 wherein said coating is partially transparent and is color reflective.

* * * * *